United States Patent
Zhang et al.

(10) Patent No.: US 10,372,995 B2
(45) Date of Patent: Aug. 6, 2019

(54) SYSTEM AND METHOD FOR PREVIEWING VIDEO

(71) Applicant: SHANGHAI XIAOYI TECHNOLOGY CO., LTD., Shanghai (CN)

(72) Inventors: Junfeng Zhang, Shanghai (CN); Lili Zhao, Shanghai (CN); Feng Li, Shanghai (CN)

(73) Assignee: SHANGHAI XIAOYI TECHNOLOGY CO., LTD., Shanghai (CN)

( * ) Notice: Subject to any disclaimer, the term of this patent is extended or adjusted under 35 U.S.C. 154(b) by 0 days.

(21) Appl. No.: 15/092,557

(22) Filed: Apr. 6, 2016

(65) Prior Publication Data

US 2017/0200050 A1 Jul. 13, 2017

(30) Foreign Application Priority Data

Jan. 12, 2016 (CN) .......................... 2016 1 0018961

(51) Int. Cl.
| | |
|---|---|
| *G06K 9/00* | (2006.01) |
| *G11B 27/031* | (2006.01) |
| *H04N 7/18* | (2006.01) |
| *G06F 16/738* | (2019.01) |

(52) U.S. Cl.
CPC ....... *G06K 9/00751* (2013.01); *G06F 16/739* (2019.01); *G11B 27/031* (2013.01); *H04N 7/188* (2013.01); *G06K 2009/00738* (2013.01)

(58) Field of Classification Search
None
See application file for complete search history.

(56) References Cited

U.S. PATENT DOCUMENTS

| | | | |
|---|---|---|---|
| 2006/0200842 A1* | 9/2006 | Chapman | H04N 7/163 725/34 |
| 2006/0250501 A1* | 11/2006 | Widmann | B60R 25/1004 348/148 |
| 2007/0233738 A1* | 10/2007 | Weinberger | G06F 17/30787 |

(Continued)

FOREIGN PATENT DOCUMENTS

| | | |
|---|---|---|
| CN | 201522767 U | 7/2010 |
| CN | 103678299 A | 3/2014 |

OTHER PUBLICATIONS

Chinese Office Action issued by the State Intellectual Property Office of the People's Republic of China in counterpart Chinese Patent Application No. 201610018961.4 dated Aug. 17, 2018.

*Primary Examiner* — Samira Monshi
(74) *Attorney, Agent, or Firm* — Cantor Colburn LLP (57) ABSTRACT

A device for previewing a video includes a memory device configured to store instructions, and one or more processors configured to execute the instructions to receive a video captured by a camera and analyze the video. The one or more processors are also configured to detect a special event from the analysis of the video. The special event includes at least one of an object, a moving object, or a sound detected in the video. The one or more processors are further configured to extract, from the video, at least one of a video preview frame or audio segment corresponding to the special event, and generate a preview video including the at least one of the video preview frame or audio segment corresponding to the special event.

20 Claims, 7 Drawing Sheets

(56) References Cited

U.S. PATENT DOCUMENTS

| | | | |
|---|---|---|---|
| 2010/0008547 A1* | 1/2010 | Yagnik | G06F 17/30781 |
| | | | 382/118 |
| 2010/0033571 A1* | 2/2010 | Fujita | B60W 40/02 |
| | | | 348/149 |
| 2013/0248617 A1* | 9/2013 | Sawaski | E03C 1/057 |
| | | | 239/73 |
| 2015/0156281 A1* | 6/2015 | Krieger | H04L 67/42 |
| | | | 709/203 |
| 2016/0205358 A1* | 7/2016 | Dickinson | H04N 7/181 |
| | | | 348/157 |

\* cited by examiner

SYSTEM AND METHOD FOR PREVIEWING VIDEO

CROSS-REFERENCE TO RELATED APPLICATION

This application is based upon and claims the benefit of priority from Chinese Patent Application No. 201610018961.4, filed on Jan. 12, 2016, the disclosure of which is expressly incorporated herein by reference in its entirety.

TECHNICAL FIELD

The present disclosure generally relates to previewing a video, and more specifically relates to systems and methods for generating and presenting a shortened version of a video.

BACKGROUND

Video monitoring devices allow individuals and businesses to monitor premises for various purposes, including, for example, security, baby or elderly monitoring, videoconferencing, etc. Such video monitoring devices may record videos continuously, generating a huge amount of video data every day. Reviewing video data, however, may be challenging. For example, a user may not have enough time to review a video in its entirety.

Such inconvenience may be partially resolved by displaying some video preview frames extracted from the video so that a user can review the video preview frames instead of the whole video. Although this method may be easy to implement, there are shortcomings. For example, in the method, a video preview frame may be extracted from the video every certain period of time. The extracted video preview frames may not catch all special events (e.g., a baby crying). Thus, a user who only reviews these video preview frames may miss some special events. In addition, the video preview frames presented to the user may look the same, and the user may still miss a special event included in the video preview frames if there is no indication that the special event occurred.

SUMMARY

One aspect of the present disclosure is directed to a device for previewing a video. The device includes a memory device configured to store instructions and one or more processors configured to execute the instructions to receive a video captured by a camera and analyze the video. The one or more processors are also configured to detect a special event from the analysis of the video. The special event includes at least one of an object, a moving object, or a sound detected in the video. The one or more processors are further configured to execute the instructions to extract, from the video, at least one of a video preview frame or audio segment corresponding to the special event, and generate a preview video including the at least one of the video preview frame or audio segment corresponding to the special event.

Another aspect of the present disclosure is directed to a system for previewing a video. The system includes a camera including an image sensor and a first processor. The camera is configured to capture a video and transmit a request for uploading the video. The camera is also configured to receive a response including an address for uploading the video, and upload the video. The system also includes a processing server including a second processor. The processing server is configured to receive the video, analyze the video, and detect a special event from the analysis of the video. The special event includes at least one of an object, a moving object, or a sound detected in the video. The processing server is further configured to extract, from the video, at least one of a video preview frame or audio segment corresponding to the special event, and generate a preview video including the at least one of the video preview frame or audio segment corresponding to the special event.

Yet another aspect of the present disclosure is directed to a method for previewing a video. The method includes receiving a video captured by a camera. The method also includes analyzing the video and detecting a special event from the analysis of the video, the special event including at least one of an object, a moving object, or a sound detected in the video. The method further includes extracting, from the video, at least one of a video preview frame or audio segment corresponding to the special event, and generating a preview video including the at least one of the video preview frame or audio segment corresponding to the special event.

Yet another aspect of the present disclosure is directed to a method for previewing a video. The method includes capturing, by a camera, a video, and transmitting, by the camera, a request for uploading the video. The method also includes receiving, by the camera, a response including an address for uploading the video, and transmitting, by the camera, the video to the address included in the response. The method further includes receiving, by a processing server, the video. The method also includes analyzing, by the processing server, the video, and detecting, by the processing server, a special event from the analysis of the video. The special event includes at least one of an object, a moving object, or a sound detected in the video. The method further includes extracting, by the processing server, from the video at least one of a video preview frame or audio segment corresponding to the special event, and generating, by the processing server, a preview video including the at least one of the video preview frame or audio segment corresponding to the special event.

Yet another aspect of the present disclosure is directed to a non-transitory computer readable medium embodying a computer program product, the computer program product comprising instructions configured to cause a computing device to receive a video captured by a camera and analyze the video. The computer program product includes instructions also configured to cause the computing device to detect a special event from the analysis of the video. The special event includes at least one of an object, a moving object, or a sound detected in the video. The computer program product includes instructions also configured to cause the computing device to extract, from the video, at least one of a video preview frame or audio segment corresponding to the special event, and generate a preview video including the at least one of the video preview frame or audio segment corresponding to the special event.

DESCRIPTION OF DRAWINGS

Methods, systems, and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Reference will now be made in detail to the disclosed embodiments, examples of which are illustrated in the accompanying drawings. Wherever convenient, the same reference numbers will be used throughout the drawings to refer to the same or like parts.

Features and characteristics of the present disclosure, as well as methods of operation and functions of related elements of structure and the combination of parts and economies of manufacture, may become more apparent upon consideration of the following description with reference to the accompanying drawings, all of which form a part of this specification. It is to be understood, however, that the drawings are for the purpose of illustration and description only and are not intended as a definition of the limits of the invention. As used in the specification and in the claims, the singular form of "a", "an", and "the" include plural referents unless the context clearly dictates otherwise.

Figure 1:
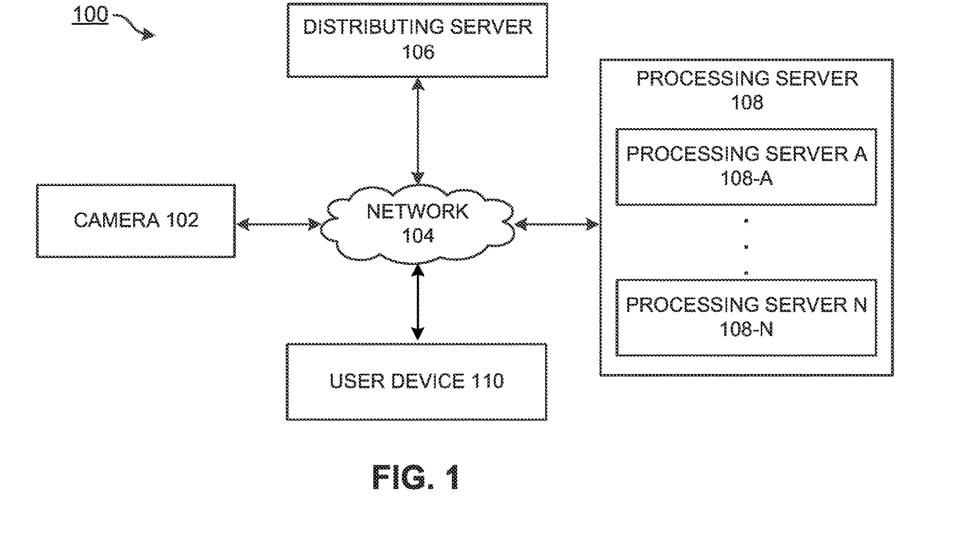
FIG. 1 is a block diagram of an exemplary system for presenting a preview video according to some embodiments.

The disclosure is directed to a system and method for previewing one or more videos captured by a camera. For example, FIG. 1 illustrates an exemplary system 100 including a camera 102, a network 104, a distributing server 106, and one or more processing servers 108 (designated 108A to 108N). Camera 102 is a device configured to capture a video. For example, camera 102 can be a digital camera, a web camera, a smartphone, a tablet, a laptop, or a video gaming console equipped with a web camera. Camera 102 is configured to transmit the captured videos to other components of system 100 via, for example, network 104.

In some embodiments, camera 102 transmits a request for uploading a video to distributing server 106 via network 104. In response to the request, distributing server 106 determines one of the one or more processing servers 108 that is suitable and available for receiving and processing the one or more videos. Distributing server 106 also determines an address associated with processing server 108 to which the one or more videos will be uploaded. Distributing server 106 then generates a response including the upload address, and transmits the response to camera 102. Camera 102 uploads the one or more videos to processing server 108 using the address included in the response. In some embodiments, camera 102 and distributing server 106 are packaged in a single device (e.g., camera 102) configured to perform functions of camera 102 and distributing server 106 disclosed in this application.

In some embodiments, processing server 108 receives and analyzes the one or more videos uploaded by camera 102. Processing server 108 also detects and identifies one or more special events from the analysis of the video(s). Processing server 108 further extracts from the analyzed video(s) one or more video preview frames presenting the identified special event(s). Alternatively or additionally, in some embodiments, processing server 108 also extracts from the analyzed video(s) one or more audio segments presenting the identified special event(s). Processing server 108 also generates a preview video including the extracted video preview frames and/or audio segments. Processing server 108 further transmits the preview video to distributing server 106 for distributing and/or user device 110 for the user's review. In some embodiments, distributing server 106 and processing server 108 are packaged in a single device configured to perform functions of distributing server 106 and processing server 108 disclosed in this application. In other embodiments, camera 102, distributing server 106, and processing server 108 are packaged in a single device configured to perform functions of camera 102, distributing server 106, and processing server 108 disclosed in this application.

In some embodiments, user device 110 receives a preview video from distributing server 106 or processing server 108. User device 110 also presents the preview video to the user at the user's request.

Figure 2:
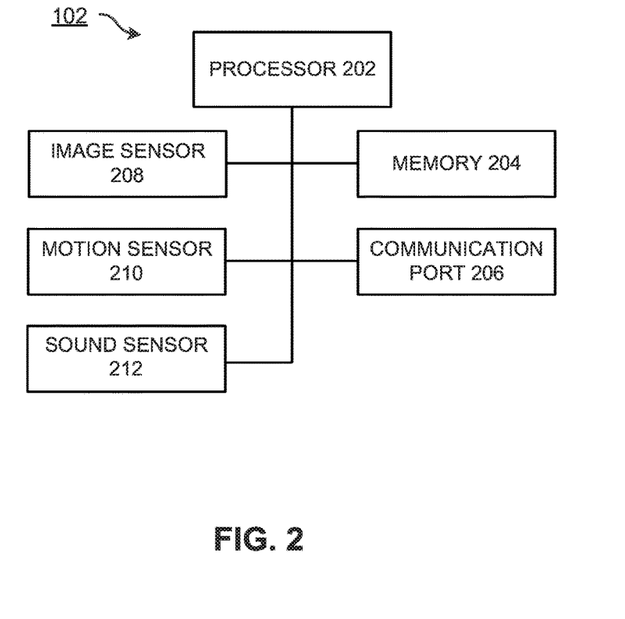
FIG. 2 is a block diagram of an exemplary camera according to some embodiments.

FIG. 2 illustrates an exemplary configuration of camera 102. Camera 102 includes a processor 202, a memory 204, a communication port 206, an image sensor 208, a motion sensor 210, and a sound sensor 212. In operation, processor 202 executes computer instructions (program code) and performs functions in accordance with techniques described herein. For example, processor 202 instructs image sensor 208 to capture a video continuously. In other embodiments, processor 202 receives a signal from motion sensor 210 or sound sensor 212 indicating a potential (moving) object. Processor 202 then instructs image sensor 208 to capture one or more videos. Processor 202 includes or is part of one or more known processing devices such as, for example, a microprocessor. In some embodiments, processor 202 includes any type of single or multi-core processor, mobile device microcontroller, central processing unit, etc.

Memory 204 is configured to store one or more computer programs to be executed by processor 202 to perform exemplary functions disclosed herein. For example, memory 204 is configured to store program(s) executed by processor 202 to receive a signal from motion sensor 210 indicating a potential special event and instruct image sensor 208 to capture a video. Memory 204 is also be configured to store data and/or parameters used by processor 202 in methods described in this disclosure. For example, memory 204 stores thresholds for detecting a potential special event based on a signal received from motion sensor 210 and/or sound sensor 212. Processor 202 can access the threshold(s) stored in memory 204, and detect one or more potential special events based on the received signal(s). Memory 204 may be a volatile or non-volatile, magnetic, semiconductor, tape, optical, removable, non-removable, or other type of storage device or tangible (i.e., non-transitory) computer-readable medium including, but not limited to, a ROM, a flash memory, a dynamic RAM, and a static RAM.

Communication port 206 is configured to transmit to and receive data from, among other devices, distributing server 106, processing server(s) 108, and/or user device 110 over network 104. Network 104 may be any type of wired or wireless network that allows transmitting and receiving data. For example, network 104 may be a wired network, a local wireless network, (e.g., Bluetooth™, WiFi, near field communications (NFC), etc.), a cellular network, the Internet, or the like, or a combination thereof. Other known communication methods which provide a medium for transmitting data between separate devices are also contemplated.

Image sensor 208 is in communication with processor 202 and configured to capture videos. In some embodiments, image sensor 208 captures a video continuously. In other embodiments, image sensor 208 receives a control signal from processor 202 and captures a video in accordance with the received control signal. Image sensor 208 stores the captured videos in memory 204.

In some embodiments, camera 102 includes one or more motion sensors 210 and/or one or more sound sensors 212 for detecting a potential special event. For example, motion sensor 210 includes an ultrasonic sensor configured to emit ultrasonic signals and detect an object (still or moving) within a vicinity of camera 102 based on the reflected ultrasonic signals. Motion sensor 210 then generates a signal indicating that an object is present (i.e., a potential special event), which is transmitted to processor 202. After receiving the signal, processor 202 instructs image sensor 208 to start capturing a video. In another example, sound sensor 212 includes a microphone configured to monitor ambient sound level. If the ambient sound level exceeds a threshold, sound sensor 212 generates a signal indicating an abnormal sound (i.e., a potential special event), which is then transmitted to processor 202. After receiving the signal, processor 202 instructs image sensor 208 to start capturing a video. Other types of sensors for detecting an object, a moving object, and/or a sound are also contemplated.

Figure 3:
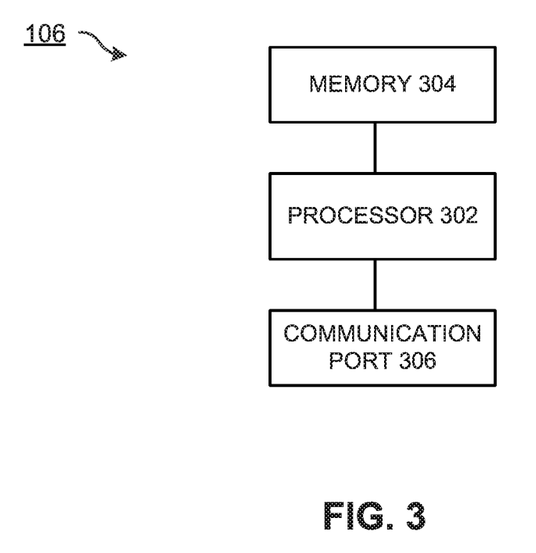
FIG. 3 is a block diagram of an exemplary distributing server according to some embodiments.

FIG. 3 illustrates an exemplary configuration of distributing server 106. Distributing server 106 includes, among other components, a processor 302, a memory 304, and a communication port 306. In operation, processor 302 executes computer instructions (program code) and performs functions in accordance with techniques described herein. For example, in some embodiments, processor 302 receives a request for uploading one or more videos from camera 102 through communication port 306 over network 104. Processor 302 determines whether one of the one or more processing servers 108 is available for receiving and processing the one or more videos. Processor 302 also determines an address associated with the one of the one or more processing servers 108 to which the one or more videos is to be uploaded. Processor 302 further generates a response including the address associated with processing server 108, and transmits the response to camera 102. Processor 302 includes or is part of one or more known processing devices such as, for example, a microprocessor. In some embodiments, processor 302 includes any type of single or multi-core processor, mobile device microcontroller, central processing unit, etc.

Memory 304 is configured to store one or more computer programs to be executed by processor 302 to perform exemplary functions disclosed herein. For example, memory 304 is configured to store program(s) to be executed by processor 302 to determine one of the one or more processing servers 108 that is suitable and available for processing a video uploaded by camera 102. Memory 304 is also configured to store data and/or parameters used by processor 302 in methods described in this disclosure. For example, memory 304 stores the information relating to the addresses associated with some or all of processing servers 108. Processor 302 can access the address information when generating a response in response to a received uploading request from camera 102. Memory 304 may be volatile or non-volatile, magnetic, semiconductor, tape, optical, removable, non-removable, or other type of storage device or tangible (i.e., non-transitory) computer-readable medium including, but not limited to, a ROM, a flash memory, a dynamic RAM, and a static RAM.

Communication port 306 is configured to transmit to and receive data from, among other devices, camera 102, processing server(s) 108, and/or user device 110 over network 104.

Figure 4:
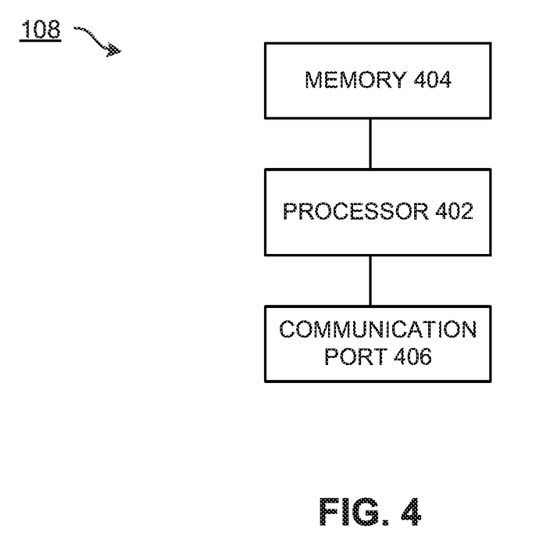
FIG. 4 is a block diagram of an exemplary processing server according to some embodiments.

FIG. 4 illustrates an exemplary configuration of processing server 108. Processing server 108 includes, among other components, a processor 402, a memory 404, and a communication port 406. In operation, processor 402 executes computer instructions (program code) and performs functions in accordance with techniques described herein. For example, in some embodiments, processor 402 receives and analyzes the one or more videos uploaded from camera 102. Processor 402 also detects and identifies one or more special events from the analysis of the video(s). Processor 402 further extracts from the analyzed video(s) one or more video preview frames and/or one or more audio segments presenting the identified special event(s). Processor 402 also generates a preview video including the extracted video preview frames and/or audio segments. Processor 402 further transmits the preview video to distributing server 106 for distributing and/or to user device 110 for the user's review. Processor 402 includes or is part of one or more known processing devices such as, for example, a microprocessor. In some embodiments, processor 402 includes any type of single or multi-core processor, mobile device microcontroller, central processing unit, etc.

Memory 404 is configured to store one or more computer programs executed by processor 402 to perform exemplary functions disclosed herein. For example, memory 404 is configured to store program(s) executed by processor 402 to detect and identify one or more special events from the received video(s) from camera 102. Memory 404 is also configured to store data and/or parameters used by processor 402 in methods described in this disclosure. For example, memory 404 stores one or more object models previously constructed for detecting a special event included in the received videos. Processor 402 can access the object models when analyzing the videos. Memory 404 may be volatile or non-volatile, magnetic, semiconductor, tape, optical, removable, non-removable, or other type of storage device or tangible (i.e., non-transitory) computer-readable medium including, but not limited to, a ROM, a flash memory, a dynamic RAM, and a static RAM.

Communication port 406 is configured to transmit to and receive data from, among other devices, camera 102, distributing server 106, and/or user device 110 over network 104.

Figure 5:
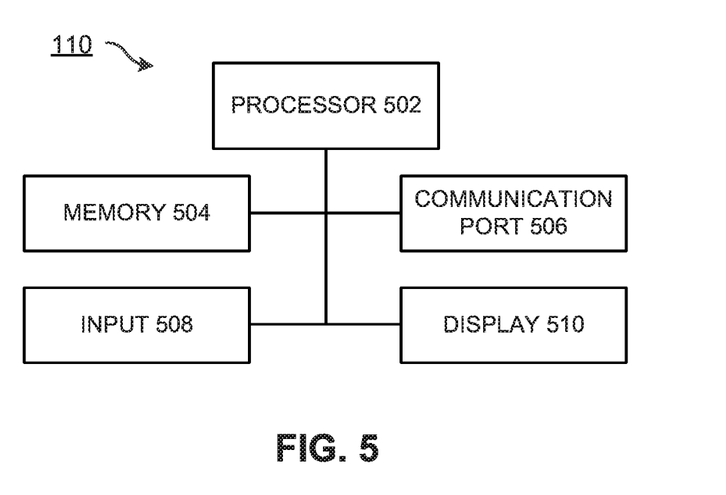
FIG. 5 is a block diagram of an exemplary user device according to some embodiments.

FIG. 5 illustrates an exemplary configuration of user device 110. User device 110 includes, among other components, a processor 502, a memory 504, a communication port 506, an input 508, and a display 510. In operation, processor 502 executes computer instructions (program code) and performs functions in accordance with techniques described herein. For example, in some embodiments, processor 502 receives a preview video from distributing server 106 or processing server 108. Processor 502 also receives an input from the user via input 508, and then presents the preview video to the user via display 510. Processor 502 further requests access to original videos captured by camera 102, which may be stored in camera 102, distributing server 106, and/or processing server 108. Processor 502 includes or is part of one or more known processing devices such as, for example, a microprocessor. In some embodiments, processor 502 may include any type of single or multi-core processor, mobile device microcontroller, central processing unit, etc.

Memory 504 is configured to store one or more computer programs to be executed by processor 502 to perform exemplary functions disclosed herein. For example, memory 504 is configured to store program(s) that may be executed by processor 502 to present the received preview video to the user. Memory 504 is also configured to store data and/or parameters used by processor 502 in methods described in this disclosure.

Communication port 506 is configured to transmit data to and receive data from, among other devices, camera 102, distributing server 106, and/or processing server(s) 108 over network 104.

Figure 6:
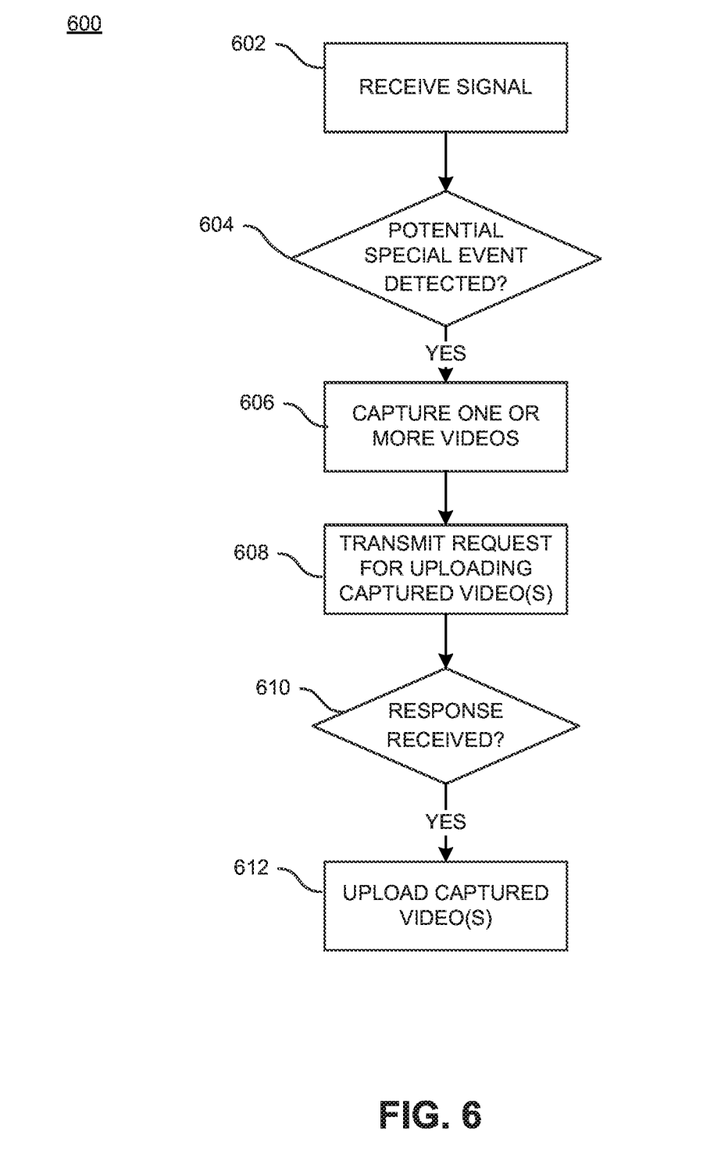
FIG. 6 is a flowchart of an exemplary process for capturing and uploading a video according to some embodiments.

FIG. 6 is a flowchart of an exemplary process 600 for capturing and uploading one or more videos. At 602, camera 102 receives a signal from motion sensor 210 and/or sound sensor 212 indicating a potential special event. For example, motion sensor 210 detects a moving object and generates a signal indicating that a potential motion event occurs. In another example, sound sensor 212 detects a change in ambient sound level and generates a signal indicating a sound level. The generated signal also includes information relating to the potential motion event (e.g., a time stamp thereof). The signal is transmitted to processor 202.

At 604, processor 202 determines whether a potential special event occurs based on the received signal from motion sensor 210 and/or sound sensor 212. For example, processor 202 determines whether the sound level included in the signal exceeds a threshold. If so, processor 202, at 606, instructs image sensor 208 to capture one or more videos.

In some embodiments, process 600 starts at 606, and image sensor 208 captures videos continuously without detecting a potential event.

At 608, processor 202 generates a request for uploading one or more captured videos and transmits the request to distributing server 106. In some embodiments, processor 202 transmits a request once a video is captured. In other embodiments, processor 202 transmits a request for uploading the video(s) captured within a predetermined period of time (e.g., 6, 12, or 24 hours).

In some embodiments, the request includes information relating to camera 102 and/or the video(s) to be uploaded. For example, the request includes the identity of camera 102 and/or the user information associated with camera 102. The identity of camera 102 includes an IP (or web) address and/or device ID of camera 102. The user information includes user name and password for communicating with distributing server 106 and/or processing servers 108. The request also includes the size, length, resolution, and/or frame rate of the video(s) to be uploaded. The request further includes information relating to a potential special event(s) detected by camera 102 (if any). For example, the request includes the time stamp(s) of potential special event(s) appearing in the video(s) or occurring in the real time.

Figure 7:
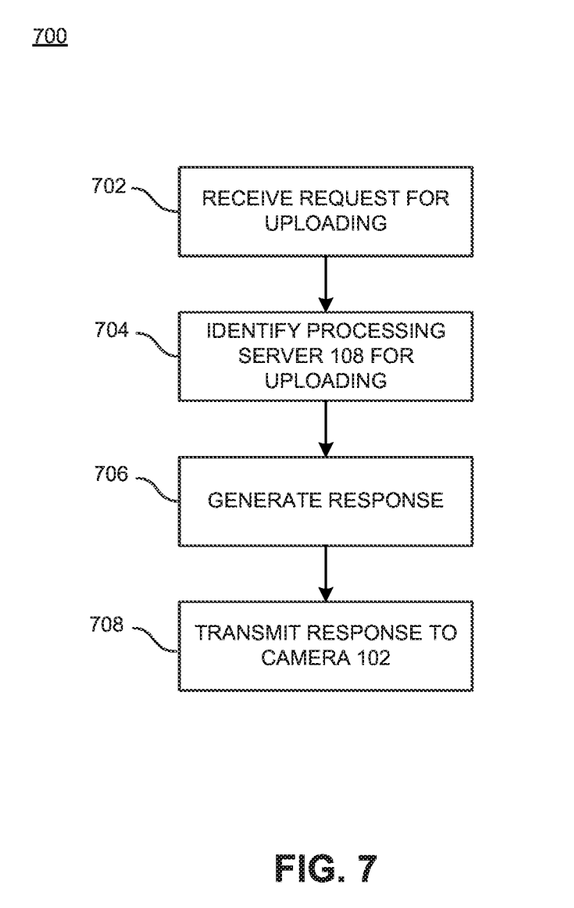
FIG. 7 is a flowchart of an exemplary process for processing a request for uploading a video according to some embodiments.

FIG. 7 is a flowchart of an exemplary process 700 for processing an upload request transmitted by camera 102. At 702, processor 302 of distributing server 106 receives the request. At 704, processor 302 determines one of processing servers 108 that is suitable and available for receiving and processing the videos. Such determination is made based on availability of one or more processing servers 108 and/or information included in the upload request. For example, processor 302 estimates that processing the video will take, for example, 30 minutes. Processor 302 also determines that processing server 108-A is available for processing the video based on the estimated processing time and availability of processing servers 108. In some embodiments, processor 302 determines that a certain one of processing servers 108 has already processed one or more videos uploaded by a camera 102 within a period of time (e.g., 12 or 24 hours). Processor 302 then assigns the task for processing the new video to the same processing server 108.

In some embodiments, processor 302 obtains an upload address associated with the one of processing servers 108 to which camera 102 uploads the video. At 706, processor 302 also generates a response including the upload address, which is then transmitted to camera 102 at 708 over network 104.

Referring again to FIG. 6, at 610, processor 202 of camera 102 determines whether a response is received. If so, processor 202 extracts the upload address from the received response, and uploads the video to the upload address at 612. Processor 202 also transmits to processing server 108 information relating to the video and/or camera 102, including, for example, the IP (or web) address and/or device ID of camera 102, the user information, the size, length, resolution, and/or frame rate of the video, and/or information relating to potential special event(s) detected by camera 102 (if any). Alternatively or additionally, distributing server 106 forwards the information included in the request to processing server 108.

Alternatively or additionally, distributing server 106 provides the address of camera 102 (or the address where the video is stored) to processing server 108. Processing server 108 then requests access to the video and downloads the video. Processing server 108 also obtains information relating to the video from camera 102 and/or distributing server 106.

Figure 8:
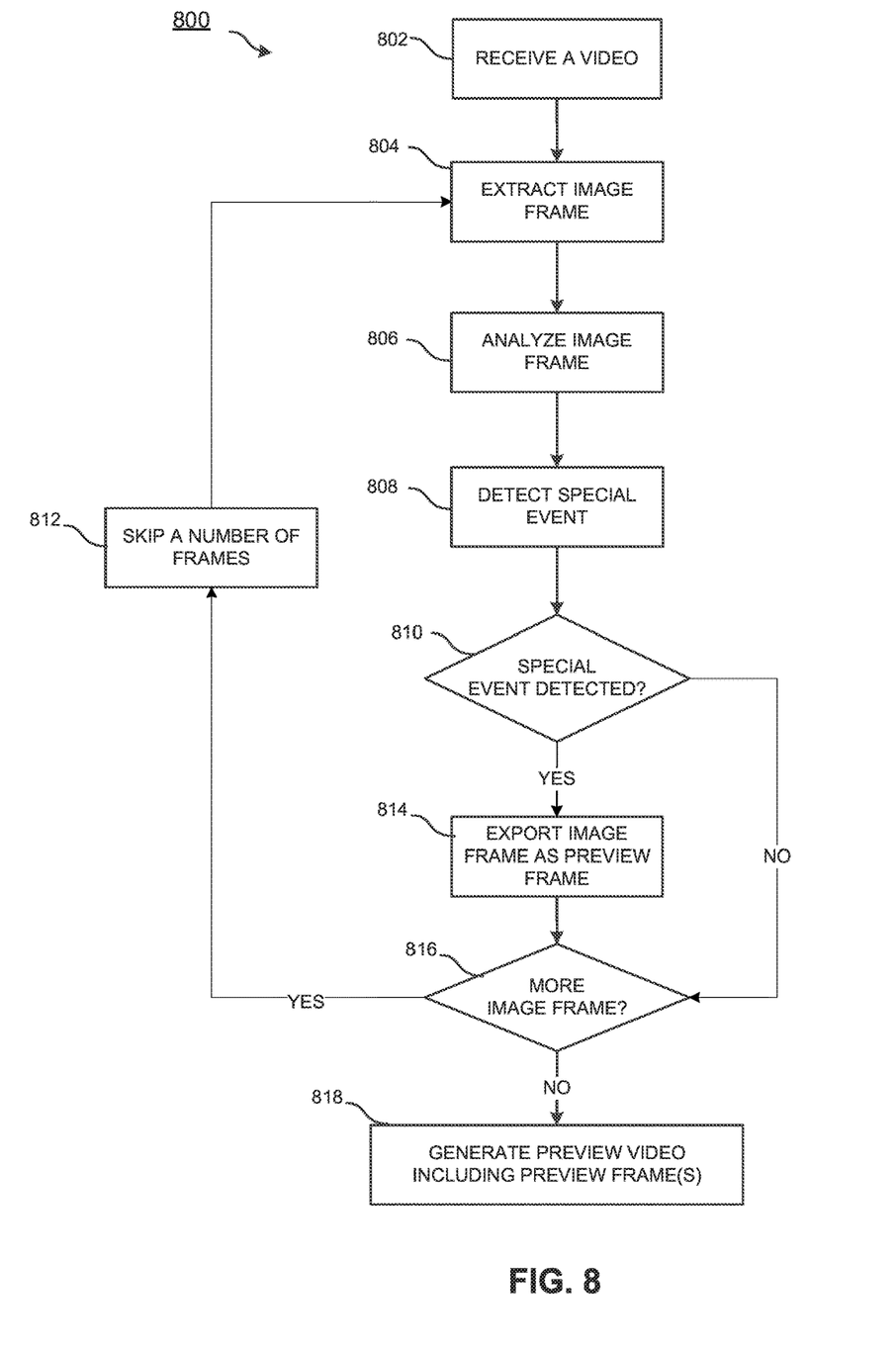
FIG. 8 is a flowchart of an exemplary process for generating a preview video according to some embodiments.

FIG. 8 is a flowchart of an exemplary process 800 for generating a preview video for the received video(s). At 802, processor 402 of processing server 108 receives a video captured by camera 102. At 804, processor 402 extracts an image frame from the received video. In some embodiments, processor 402 extracts the first video frame from the video. In other embodiments, processor 402 obtains information relating to a potential special event identified by camera 102 (e.g., the time stamp of the potential special event appearing in the video). Processor 402 extracts from the video one or more image frames based on the information. For example, processor 402 extracts from the video one or more image frames around the time stamp of the potential special event.

At 806, processor 402 analyzes the extracted video frame. For example, in some embodiments, processor 402 may analyze the video frame to identify an object or a moving object included in the image frame. Merely by way of example, processor 402 identifies one or more image features included in the extracted image frame. Exemplary image feature(s) may include human bodies, human faces, pets, things, etc. The algorithm(s) for detecting one or more objects in an image may be utilized to identify image features, including, for example, blob detection, edge detection, scale-invariant feature transformation, corner detection, shape detection, etc. Other algorithms for detecting an object from an image are also contemplated. Processor 402 also identifies one or more objects included in the identified image feature(s) by, for example, comparing the identified image feature(s) with one or more object models (and/or scene models) previously constructed. An object (or scene) model is generated by distributing server 106 and/or processing server 108 based on one or more images of a known object. Processor 402 further identifies the object(s) included in the image feature(s). For example, processor 402 determines that the detected image feature in the image frame is a man's face by comparing the image feature with one or more object models. Processor 402 also determines the face detected in the video frame may be the face of a wanted man. In some embodiments, processor 402 identifies one or more objects from the image frame. One exemplary method for object identification is based on a Fast Region-based Convolutional Network method disclosed in a paper entitled Fast R-CNN and authored by Ross Girshick (available at http://arxiv.org/pdf/1504.08083.pdf).

In some embodiments, processor 402 identifies one or more motion features included in an image frame and its preceding (or subsequent) image frame. A motion feature is an area of sequential image frames in which the pixel values change from a video frame to a preceding (or subsequent) image frame caused by a moving object. For example, in some embodiments, processor 402 extracts an image frame and its preceding (or subsequent) image frame at 804. Processor 402 then determines a difference between an image frame and its preceding (or subsequent) image frame by, for example, comparing pixel values of the image frame and the preceding (or subsequent) image frame. If the difference is equal to or exceeds a threshold, processor 402 identifies the area as a motion feature. Processor 402 then identifies one or more motion events based on the identified motion feature(s) by, for example, comparing the identified motion feature(s) with a motion model previously constructed. For example, processor 402 identifies the moving object(s) as a moving pet or human being by, for example, comparing the motion feature(s) detected with the motion feature included in a motion model.

At 810, processor 402 determines whether a special event (i.e., an object or a moving object) is detected in the image frame. If not (the "NO" arrow out of 810 to 816), processor 402, at 816, determines whether the video includes more image frames to be extracted and analyzed. If so (the "YES" arrow out of 816 to 812), processor 402 skips a predetermined number of frames of the video at 812 and extracts another image frame at 804. The number of frames skipped can be any number between 1 and 300. In other embodiments, the number of frames skipped is restricted to a subrange of 1-30, 31-60, 61-100, 101-200, or 201-300. Alternatively, processor 402 skips a certain time period of the video at 812 before extracting another image frame at 804. For example, processor 402 skips 10 seconds of the video before extracting another image frame. In some embodiments, the time period of the video skipped can be any time period between 0.1 seconds to 60 minutes. In other embodiments, the time period skipped is restricted to a subrange of 0.1-1 second, 1-5 seconds, 6-10 seconds, 11-20 seconds, 21-60 seconds, 1-10 minutes, 11-30 minutes, or 31-60 minutes.

In some embodiments, the skipped period of time or frames of the video varies. For example, processor 402 previously skipped 10 seconds of the video before extracting another image frame. If no special event is identified within a period of time (e.g., 1 minute), processor 402 skips more than 10 seconds (e.g., 1 minute, 2 minutes, or the like) until a special event is identified. In some embodiments, if a special event is identified in an image frame at a time point, processor 402 skips less than 10 seconds (e.g., 1 or 5 seconds). In other embodiments, processor 402 skips more or less frames before extracting another image frame, depending on whether a special event is detected in the previous image frame. In some embodiments, after processor 402 extracts another image frame at 804, the process proceeds at 806, as described above.

Referring again to 810, if processor 402 determines that at least one special event is detected in the image frame (the "YES" arrow out of 810 to 814), processor 402 exports the image frame as a preview frame at 814. Processor 402 also obtains the information relating to the special event detected in the image frame. The information relating to the special event includes a time stamp of the special event and/or a type of the special event (i.e., an object or a moving object). In some embodiments, processor 402 also converts the preview frame into a lower-resolution version thereof. Merely by way of example, processor 402 converts a preview frame with a resolution of 1280×720 to an image with a resolution of 640×360, or 320×180, or the like.

Processor 402 then, at 816, determines whether the video includes more image frames to be extracted and analyzed, as described elsewhere in this disclosure. If no (the "NO" arrow out of 816 to 818), processor 402 compiles all preview frames (or a lower-resolution version thereof) and generates a preview video (or a motion picture) using the preview frames (or a lower resolution version thereof) at 818. The preview video also includes the information relating to the special event(s) detected in the preview frames, including, for example, time stamp(s) of the special event(s) and/or type(s) of the special event(s). The preview video has a predetermined frame rate. For example, the frame rate of the preview video is within a range of 1 frame per second (fps) to 60 fps. In other embodiments, the frame rate of the preview video is restricted in a subrange of 1-5 fps, 6-10 fps, 10-30 fps, or 31-60 fps.

In some embodiments, processor 402 transmits the preview video to distributing server 106 and/or user device 110. Processor 402 also transmits the information relating to the original video(s) and/or the special event(s) identified. The information includes the storage address(es) of the original video(s), the metadata of the original video(s), information relating to camera 102 that captured the original video(s). The information also includes time stamp(s) of the special event(s) and/or type(s) of the special event(s). Merely by way of example, the user sends a request for reviewing the video(s) captured by camera 102 to distributing server 106 through user device 110. In response, distributing server 106 forwards the request to processing server 108, which then transmits, to user device 110, the preview video(s) associated with the video(s) requested. User device 110 presents the received preview video(s) to the user via display 510. User device 110 also presents to the user the received information relating to special event(s). In some embodiments, the user can also request access to the original video(s). For example, user device 110 receives an input via input 508 from the user to request an original video associated with the preview video. User device 110 then transmits a request for the original video to camera 102, distributing server 106, or processing server 108, which then transmits the requested video to user device 110 for the user's review.

Referring again to FIG. 8, in some embodiments, processor 402 obtains one or more preview frames based on an audio signal of the video, as an alternative or in addition to determining a preview frame based on the analysis of image frames described above (i.e., steps 802 through 814).

Figure 9:
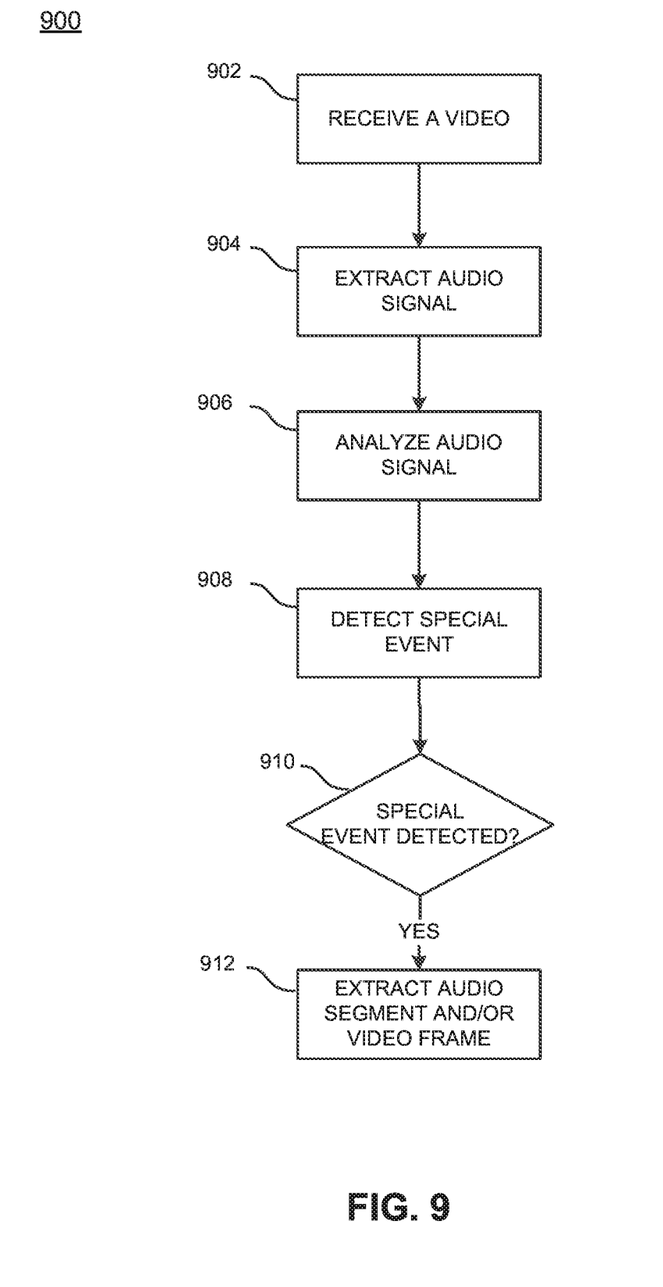
FIG. 9 is a flowchart of an exemplary process for extracting one or more preview frames according to some embodiments.

FIG. 9 is a flowchart of an exemplary process 900 for detecting one or more special events and exporting an audio segment of the video and/or preview frame associated with the detected special event(s). At 902, processor 402 receives a video. Processor 402, at 904, extracts an audio signal from the video. Processor 402 analyzes the audio signal at 906 and detects one or more special event(s) from the analysis of the audio signal at 908. Merely by way of example, processor 402 determines whether there is any speech or any particular sound (e.g., baby crying, glass shattering, etc.) included in the audio signal. Processor 402 also detects a break-in event based on the detected sound of shattering glass (e.g., a window) in the audio signal. Processor 402 further obtains information relating to the detected special event(s). For example, processor 402 obtains the time stamp of the sound detected and associated with a special event.

At 908, processor 402 determines whether there is any special event detected. If so, processor 402 extracts an audio segment of the audio signal indicating the detected special event. Alternatively or additionally, processor 402 extracts one or more image previews around the time stamp of the sound detected and associated with the special event. Processor 402 also exports the image frames as preview frames. Processor 402 further generates a preview video using the preview frames, in addition to the preview frames selected based on the exemplary process 800 described above. In some embodiments, the preview video includes the extracted audio segment(s).

In some embodiments, processor 402 receives more than one video from camera 102. Merely by way of example, camera 102 transmits a video to processing server 108 in the morning and another video in the afternoon. Processor 402 also processes the received videos and detects any special event included in the videos, as described elsewhere in this disclosure. Processor 402 further obtains preview frames and/or audio segments associated with the special event(s) detected, as described elsewhere in this disclosure. In some embodiments, processor 402 associates the preview frames and/or audio segments obtained from different videos. Processor 402 also generates a single preview video using the preview frames obtained from the videos.

While illustrative embodiments have been described herein, the scope of any and all embodiments have equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed processes may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A device for previewing a video, the device comprising: a memory device configured to store instructions; and one or more processors configured to execute the instructions to:
   receive the video captured by a camera, wherein the camera includes an image sensor, a sound sensor, and a motion sensor including an ultrasonic sensor;
   obtain information relating to a potential special event detected by the camera, wherein the information relating to the potential special event is obtained by at least one of the motion sensor or the sound sensor, the ultrasonic sensor configured to emit ultrasonic signals to detect an object within a vicinity of the camera based on reflected ultrasonic signals and the motion sensor configured to generate a signal indicating that the object is present, the sound sensor configured to generate a signal if the sounds sensor detects an ambient sound level exceeding a threshold, wherein a processor of the camera is responsive to the signal generated by the motion sensor or the sound sensor to instruct the image sensor to start capturing the video;
   analyze the captured video;
   detect a special event from the analysis of the video by comparing an identified feature with one or more object, motion, or sound models previously constructed, the special event including at least one of an object, a moving object, or a sound detected in the video;
   extract, from the video, at least a first video preview frame or audio segment corresponding to the special event based on information relating to the potential special event, wherein the one or more processors are further configured to skip frames before extracting a second video preview frame or audio segment, depending on whether the special event is detected in the first video preview frame or audio segment, wherein the skipped frames correspond to a time period selected by the one or more processors for skipping frames, a length of the time period being selected based on whether the special event is detected in a previous time period; and
   generate a preview video including the at least first video preview frame or audio segment corresponding to the special event.

2. The device of claim 1, wherein the one or more processors are further configured to execute the instructions to transmit the preview video to a user.

3. The device of claim 1, wherein the special event is a first special event, the one or more processors being further configured to execute the instructions to:
   detect a second special event from the analysis of the video, the second special event including at least one of an object, a moving object, or a sound detected in the video; and
   extract, from the video, at least one of a video preview frame or audio segment corresponding to the second special event, wherein the preview video further includes the at least one of the video preview frame or audio segment corresponding to the second special event.

4. The device of claim 1, wherein the video is a first video and the special event is a first special event, the one or more processors being further configured to execute the instructions to:
   receive a second video captured by the camera;
   analyze the second video;
   detect a second special event from the analysis of the second video, the second special event including at least one of an object, a moving object, or a sound detected in the second video; and
   extract, from the second video, at least one of a video preview frame or audio segment corresponding to the second special event, wherein the preview video further includes the at least one of the video preview frame or audio segment corresponding to the second special event.

5. The device of claim 3, wherein the one or more processors are further configured to execute the instructions to:
receive another video captured by the camera;
analyze the another video;
detect a third special event from the analysis of the another video, the third special event including at least one of an object, a moving object, or a sound detected in the another video; and
extract, from the another video, at least one of a video preview frame or audio segment corresponding to the third special event, wherein the preview video further includes the at least one of the video preview frame or audio segment corresponding to the third special event.

6. A system for previewing a video, the system comprising:
a camera including an image sensor, a sound sensor, a motion sensor including an ultrasonic sensor, and a first processor, the camera configured to:
emit ultrasonic signals, by the ultrasonic sensor, to detect an object within a vicinity of the camera;
detect at least one of an object, by the motion sensor, based on reflected ultrasonic signals or an ambient sound, by the sound sensor, that exceeds a threshold;
generate a signal by the motion sensor indicating that the object is present or a signal by the sound sensor indicating the ambient sound exceeds the threshold;
transmit the signal generated by the motion sensor or the sound sensor to the first processor;
receive an instruction, from the first processor responsive to the signal generated by the motion sensor or the sound sensor, to start capturing a video;
capture, by the image and sound sensors, the video,
transmit a request for uploading the video,
receive a response including an address for uploading the video, and upload the video; and
a processing server including a second processor, the processing server configured to:
receive the video,
analyze the video,
detect a special event from the analysis of the video by comparing an identified feature with one or more object, motion, or sound models previously constructed, the special event including at least one of an object, a moving object, or a sound detected in the video,
extract, from the video, at least a first video preview frame or audio segment corresponding to the special event, wherein the processing server is further configured to skip frames before extracting a second video preview frame or audio segment, depending on whether the special event is detected in the first video preview frame or audio segment, wherein the skipped frames correspond to a time period selected by the processing server for skipping frames, a length of the time period being selected based on whether the special event is detected in a previous time period, and
generate a preview video including the at least first video preview frame or audio segment corresponding to the special event.

7. The system of claim 6, further comprising a distributing server, including a third processor, the distributing server configured to:
receive, from the camera, the request for uploading the first video, and
generate, in response to the request, the response including the address for uploading the video, wherein
the camera is further configured to upload the video to the address included in the response, and
the processing server is further configured to receive the video from the address to which the first video is uploaded.

8. The system of claim 6, wherein the camera is further configured to:
receive a signal indicating the potential special event including at least one of a potential object, a potential moving object, or a potential sound; and
capture the video including the potential special event.

9. The system of claim 8, wherein:
the camera is further configured to:
obtain information relating to the potential special event, and
transmit, to the processing server, the information relating to the potential special event; and
the processing server is further configured to:
receive the information relating to the potential special event, and
detect the special event based, at least in part, on the information relating to the potential special event.

10. The system of claim 6, wherein the special event is a first special event, and the processing server is further configured:
detect a second special event from the analysis of the video, the second special event including at least one of an object, a moving object, or a sound detected in the video; and
extract, from the video, at least one of a video preview frame or audio segment corresponding to the second special event, wherein the preview video further includes the at least one of the video preview frame or audio segment corresponding to the second special event.

11. A method for previewing a video, the method comprising:
receiving the video captured by a camera, wherein the camera includes an image sensor, a sound sensor, and a motion sensor including an ultrasonic sensor;
obtaining information relating to a potential special event detected by the camera, wherein the information relating to the potential special event is obtained by at least one of the motion sensor or the sound sensor, the ultrasonic sensor configured to emit ultrasonic signals to detect an object within a vicinity of the camera based on reflected ultrasonic signals and the motion sensor configured to generate a signal indicating that the object is present, the sound sensor configured to generate a signal if the sounds sensor detects an ambient sound level exceeding a threshold, wherein a processor of the camera is responsive to the signal generated by the motion sensor or the sound sensor to instruct the image sensor to start capturing the video;
analyzing the captured video;
detecting a special event from the analysis of the video by comparing an identified feature with one or more object, motion, or sound models previously constructed, the special event including at least one of an object, a moving object, or a sound detected in the video;
extracting, from the video, at least a first video preview frame or audio segment corresponding to the special event based on information relating to the potential special event, and skipping frames before extracting a second video preview frame or audio segment, depending on whether the special event is detected in the first video preview frame or audio segment, wherein the skipped frames correspond to a time period selected for skipping frames, a length of the time period being selected based on whether the special event is detected in a previous time period; and generating a preview video including the at least first video preview frame or audio segment corresponding to the special event.

12. The method of claim 11, further comprising transmitting the preview video to a user.

13. The method of claim 11, wherein the special event is a first special event, the method further comprising:

detecting a second special event from the analysis of the video, the second special event including at least one of an object, a moving object, or a sound detected in the video; and extracting, from the video, at least one of a video preview frame or audio segment corresponding to the second special event, wherein the preview video further includes the at least one of the video preview frame or audio segment corresponding to the second special event.

14. The method of claim 11, wherein the video is a first video and the special event is a first special event, the method further comprising:

receiving a second video captured by the camera;

analyzing the second video;

detecting a second special event from the analysis of the second video, the second special event including at least one of an object, a moving object, or a sound detected in the second video; and extracting, from the second video, at least one of a video preview frame or audio segment corresponding to the second special event, wherein the preview video further includes the at least one of the video preview frame or audio segment corresponding to the second special event.

15. The method of claim 13, further comprising:

receiving another video captured by the camera;

analyzing the another video;

detecting a third special event from the analysis of the another video, the third special event including at least one of an object, a moving object, or a sound detected in the another video; and extracting, from the another video, at least one of a video preview frame or audio segment corresponding to the third special event, wherein the preview video further includes the at least one of the video preview frame or audio segment corresponding to the third special event.

16. A method for previewing a video, the method comprising:

emitting ultrasonic signals, by an ultrasonic sensor, to detect an object within a vicinity of a camera, wherein the camera includes an image sensor, a sound sensor, a motion sensor including the ultrasonic sensor, and a camera processor;

at least one of detecting an object based on reflected ultrasonic signals or detecting by the sound sensor if an ambient sound level exceeds a threshold;

at least one of generating a signal, by the motion sensor, indicating that the object is present or generating a signal, by the sound sensor, indicating the ambient sound level exceeds the threshold;

receiving an instruction, from the camera processor responsive to the signal generated by the motion sensor or the sound sensor, to start capturing the video by the image sensor and the sound sensor;

capturing, by the camera, the video;

transmitting, by the camera, a request for uploading the video;

receiving, by the camera, a response including an address for uploading the video;

transmitting, by the camera, the video to the address included in the response;

receiving, by a processing server, the video;

analyzing, by the processing server, the video;

detecting, by the processing server, a special event from the analysis of the video by comparing an identified feature with one or more object, motion, or sound models previously constructed, the special event including at least one of an object, a moving object, or a sound detected in the video;

extracting, by the processing server, from the video at least a first video preview frame or audio segment corresponding to the special event, wherein the processing server is further configured to skip frames before extracting a second video preview frame or audio segment, depending on whether the special event is detected in the first video preview frame or audio segment, wherein the skipped frames correspond to a time period selected by the processing server for skipping frames, a length of the time period being selected based on whether the special event is detected in a previous time period; and generating, by the processing server, a preview video including the at least first video preview frame or audio segment corresponding to the special event.

17. The method of claim 16, further comprising:

receiving, by a distributing server from the camera, the request for uploading the video, and generating, by the distributing server, the response including the address for uploading the video, wherein the camera uploads the video to the address included in the response, and the processing server receives the video from the address to which the video is uploaded.

18. The method of claim 16, further comprising:

receiving, by the camera, a signal indicating the potential special event including at least one of a potential object, a potential moving object, or a potential sound; and capturing, by the camera, the video including the potential special event.

19. The method of claim 18, further comprising:

obtaining, by the camera, information relating to the potential special event;

transmitting, from the camera to the processing server, the information relating to the potential special event;

receiving, by the processing server, the information relating to the potential special event; and detecting, by the processing server, the special event based, at least in part, on the information relating to the potential special event.

20. A non-transitory computer readable medium embodying a computer program product, the computer program product comprising instructions configured to cause a computing device to:

receive the video captured by a camera, wherein the camera includes an image sensor, a sound sensor, and a motion sensor including an ultrasonic sensor;

obtain information relating to a potential special event detected by the camera, wherein the information relating to the potential special event is obtained by at least one of the motion sensor or the sound sensor, the ultrasonic sensor configured to emit ultrasonic signals to detect an object within a vicinity of the camera based on reflected ultrasonic signals and the motion sensor configured to generate a signal indicating that the object is present, the sound sensor configured to generate a signal if the sounds sensor detects an ambient sound level exceeding a threshold, wherein a processor of the camera is responsive to the signal generated by the motion sensor or the sound sensor to instruct the image sensor to start capturing the video;

analyze the captured video;

detect a special event from the analysis of the video by comparing an identified feature with one or more object, motion, or sound models previously constructed, the special event including at least one of an object, a moving object, or a sound detected in the video;

extract, from the video, at least a first video preview frame or audio segment corresponding to the special event based on information relating to the potential special event, wherein the instructions further cause the computing device to skip frames before extracting a second video preview frame or audio segment, depending on whether the special event is detected in the first video preview frame or audio segment, wherein the skipped frames correspond to a time period selected for skipping frames, a length of the time period being selected based on whether the special event is detected in a previous time period; and generate a preview video including the at least first video preview frame or audio segment corresponding to the special event.

\* \* \* \* \*